United States Patent [19]

Yen

[11] Patent Number: 5,026,477
[45] Date of Patent: Jun. 25, 1991

[54] WATER PURIFYING COMBINATION AND ULTRAVIOLET LAMP THEREFOR

[75] Inventor: Jung-Chuan Yen, Tainan, Taiwan

[73] Assignee: Huan Ting Enterprise Co., Ltd., Tainan, Taiwan

[21] Appl. No.: 556,415

[22] Filed: Jul. 24, 1990

[51] Int. Cl.$^5$ .................................... B01D 24/00
[52] U.S. Cl. ........................ 210/169; 210/192; 210/198.1; 210/232; 210/259; 210/284; 119/5; 250/436; 422/24
[58] Field of Search ............... 422/24; 250/436, 437, 250/438; 210/192, 169, 198.1, 232, 284, 252, 259, 748; 119/4, 5

[56] References Cited

U.S. PATENT DOCUMENTS

| | | |
|---|---|---|
| 2,334,802 | 11/1943 | Zuckerman ............... 210/284 |
| 3,640,391 | 2/1972 | Carpenter .................. 210/169 |
| 4,105,562 | 8/1978 | Kaplan et al. ............. 210/232 |
| 4,623,467 | 11/1986 | Hamlin ...................... 210/259 |
| 4,956,754 | 9/1990 | Chen ......................... 210/169 |

Primary Examiner—Peter Hruskoci
Assistant Examiner—Robert James Popovics
Attorney, Agent, or Firm—Morton J. Rosenberg; David I. Klein

[57] ABSTRACT

A water purifying device which includes a plurality of barrels connected one after another by means of thread engagements into an elongated tube having an inlet end and an outlet end. A number of the barrels are loaded with filtering materials such as cloth and charcoal for filtering out solids. One barrel contains an ultraviolet lamp device for destroying microorganisms, spores and the like contained in water to be purified.

2 Claims, 3 Drawing Sheets

WATER PURIFYING COMBINATION AND ULTRAVIOLET LAMP THEREFOR

BACKGROUND OF THE INVENTION

This invention relates to a device for purifying water in an aquarium and more particularly to a water purifying device combining an ultraviolet lamp device.

Purifying devices for water and other fluids have been known heretofore in which the fluid passes first through a filter to filter out any solids and then passes a source of ultraviolet rays which are effective at destroying microorganisms, spores and the like, which pass through the filter. These prior fluid purification devices have in general comprised separate units for first filtering and then sterilizing the fluids. Such units are relatively bulky, complicated and difficult to disassemble for cleaning, inspection and replacement of the filter materials and other components.

SUMMARY OF THE INVENTION

An object of the present invention is to provide an improved purifying combination for purifying water in an aquarium which can obviate the disadvantages of known water purifying devices.

It is another object of the present invention to provide an improved purifying combination which is simple, compact, easy to disassemble and highly effective.

It is a further object of the present invention to provide an improved purifying combination which discharges filtered and ultraviolet light treated water back into an aquarium to create waves in the water.

DETAILED DESCRIPTION OF THE PREFERRED EMBODIMENT

Figure 1:
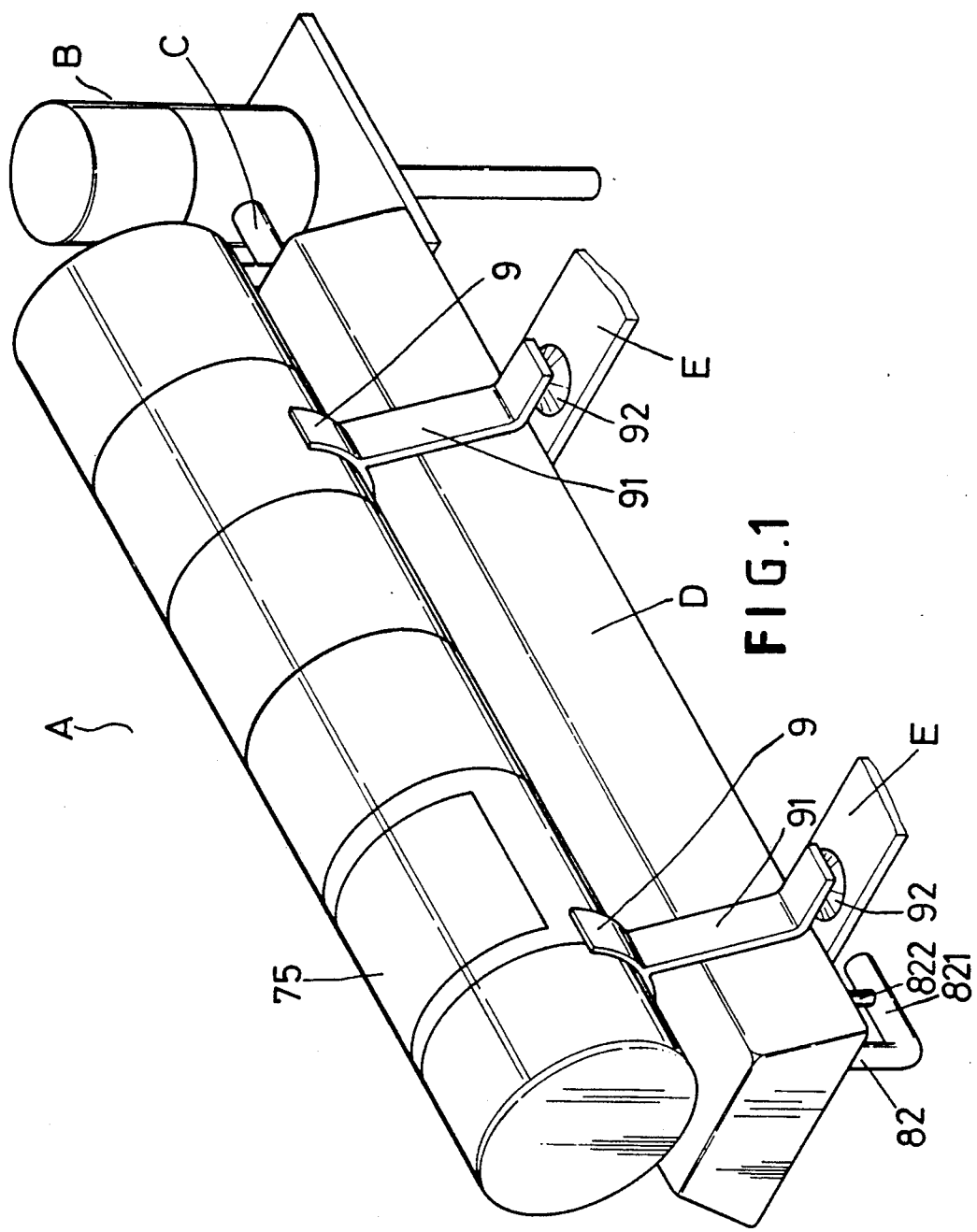
FIG. 1 is a perspective view of a preferred embodiment of a water purifying combination of the present invention which is mounted on a lamp reflector.
Figure 2:
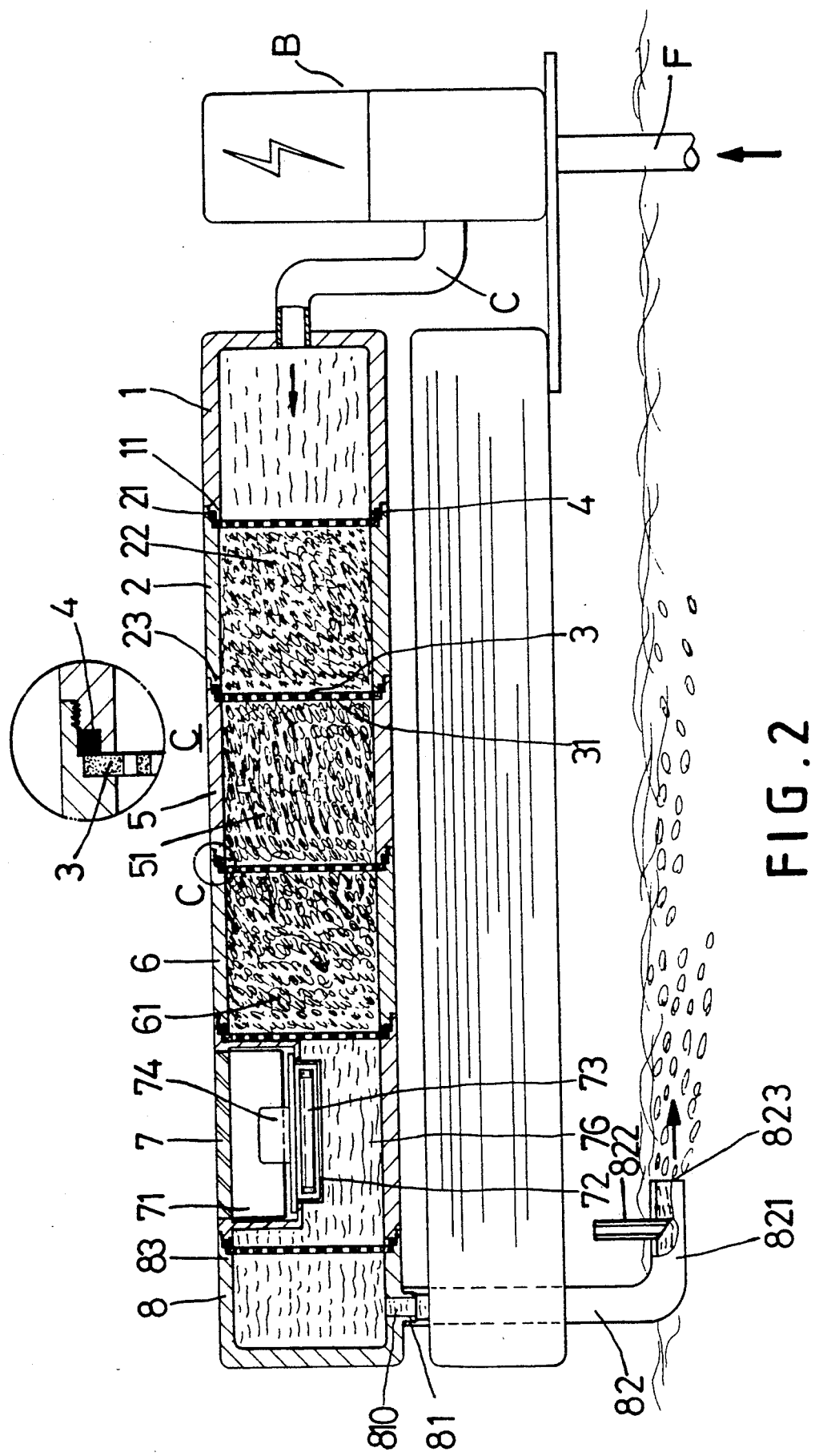
FIG. 2 is a cross-sectional view of the present invention.
Figure 3:
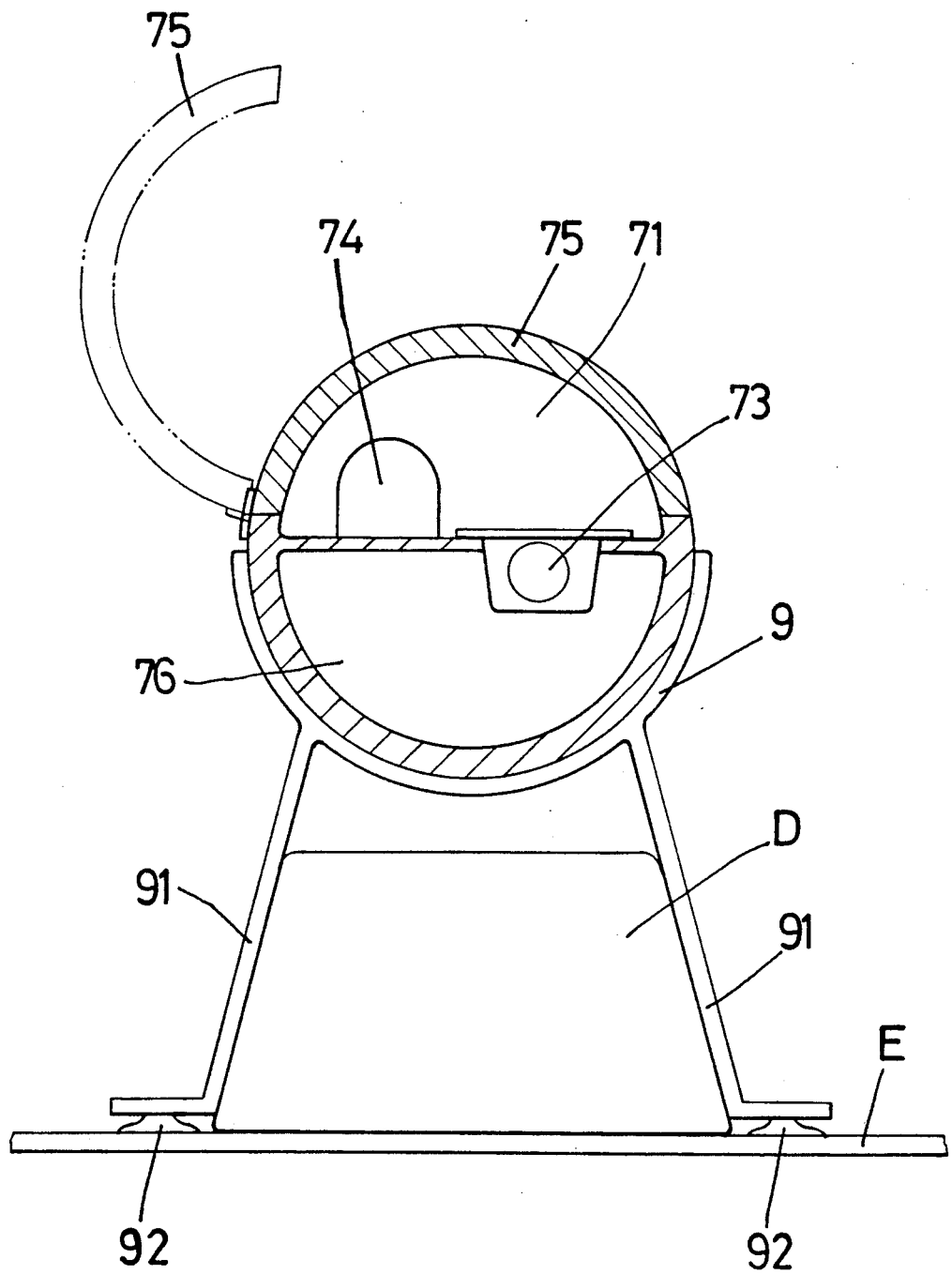
FIG. 3 is a cross-sectional view of an ultraviolet lamp compartment of the present invention.

Referring now to FIGS. 1, 2 and 3, a water purifying combination according to the present invention comprises a cylindrical purifying combination A, being supported on a pair of spaced brackets 9 which have leg members 91 extending downwardly and outwardly and terminating with flat ends, suction cups 92 attached to bottom sides of the flat ends for fastening the brackets to base plates E, extending laterally from the underside of a lamp reflector D, a suction pump B drawing water from an aquarium through an inlet pipe F and supplying water to be purified under pressure into the purifying combination A through a pipe line C and an outlet pipe 82 for discharging filtered and ultraviolet light treated water.

The purifying combination A includes two spaced end barrels 1, 8 and a plurality of intermediate barrels 2, 5, 6 and 7 joined together into an elongated coaxially directed tube. The first end barrel 1 has an external threaded open end 11 facing frontwardly and a closed end opposite to the open end 11 thereof and fluidly coupled to the outlet end of the pipe line C which communicates with the interior of the first end barrel 1. The second end barrel 8 has an internal threaded open end 83 facing rearwardly, a closed end opposed to its open end 83 and an outlet joint 81, whose central hole 810 fluidly communicates with the interior of the second end barrel 8, integrally formed on a bottom wall thereof.

Each of the intermediate barrels, take intermediate barrel 2 for example, which has an externally threaded open end 23 facing frontwardly and an internally threaded open end 21 facing rearwardly. The internally threaded open end 21 of the intermediate barrel 2 is connected to the externally threaded open end 11 of the first end barrel 1 by means of a thread engagement and the externally threaded end 23 thereof is connected to the internally threaded open end of an adjacent intermediate barrel 5 also by means of a thread engagement. An annular sealing ring 4 of elastomeric material and an annular perforated disc 3 are mounted between adjacent intermediate barrels to respectively seal them against water pressure and retain filter materials accommodated in the barrels, as best shown in an enlarged cross-sectional view C. The disc 3 is formed with a plurality of perforations 31 for passage of the water.

The intermediate barrels 2, 5, 6 and 7 are positioned contiguously one after another in such a way and further joined between the end barrels 1, 8 to form the purifying combination A in a form of elongated tube. The intermediate barrels 2, 5 and 6 accommodate suitable filtering materials 22, 51 and 61 such as cloth and loose granular activated charcoal, which are preferably formed with progressively finer degrees of porosity, to filter out any solids contained in the water to be purified.

The intermediate barrels includes an ultraviolet lamp barrel 7 which is mounted between the intermediate barrel 6 and end barrel 8 and is located downstream of the filtering intermediate barrels 2, 5 and 6. The interior of the ultraviolet lamp barrel 7 is divided into a water flow channel 76 and a compartment 71 isolated from the water flow channel 76 and disposed close to its side wall. The compartment 7 has a longer dimension along or axial direction and a shorter dimension along a radial direction for mounting an air pump 74 and an ultraviolet lamp device 73 which is enveloped with a transparent casing 72 and is removably disposed in the water flow channel 76 by resting a support frame of the ultraviolet lamp device 73 on a bottom wall of the compartment 71. The ultraviolet lamp barrel 7 is formed with a hinged cover 75 for closing the open top of the compartment 71. The air pump 74 discharges fresh air into water so as to foam the water passing through the water flow channel 76. The outlet pipe 82 is connected to outlet joint 81, and fluidly with the interior of the end barrel 8 through the opening 810. The outlet pipe 82 extends downwardly into the water in the aquarium and further bent 90 degrees rearwardly under water level. The bent portion 821 of the outlet pipe 82 is formed with an opening in the top wall thereof for receiving an air pipe 822 which extends upwardly over the water level from interior of the bent portion 821. The ultraviolet treated water under water pressure is discharged from the end barrel 8 through the outlet pipe 82 and is further mixed with fresh air entering through the air pipe 822 when passing through the bent portion 821. As the ultraviolet treated water is charged with fresh air by the air pump 74 and the air pipe 822, it foams and causes waves in the water when discharged through the outlet 823 of the outlet pipe 82.

The air pump 74 and the ultraviolet lamp device 73 are accessible simply by opening the cover 75 for replacement, cleaning or maintenance and the filtering intermediate barrels 2, 5 and 6 can be separated by unthreading for disconnection from an adjacent barrel to clean or replace filtering materials on contained therein.

What is claimed is:

1. A purifying combination comprising:

an elongated tube separated into a first end barrel member having an inlet end and a second end barrel member spaced from the first end barrel member and having an outlet end and a plurality of intermediate barrel members containing filtering materials, said intermediate barrels threadedly coupled each to the other and located substantially coaxial each to the other;

an ultraviolet lamp mounted in at least one of said intermediate barrels for treating water passing therethrough;

an annular sealing ring and a perforated disc located between adjacent intermediate barrel members for sealing against water pressure and retaining the filtering materials contained within respective intermediate barrels;

a water supplier having a discharge end connected to the inlet end of the first end barrel member for supplying water to be filtered and treated by said ultraviolet lamp, said water supplier drawing water from a water source;

an outlet pipe connected to the outlet end of the second barrel member, extending into the water source and contoured to extend substantially parallel to the water level of the water source for discharging filtered and treated water into the water source; and an air pipe extending from above the water level into the outlet pipe through a top wall thereof for mixing fresh air into the filtered and treated water passing therethrough.

2. A purifying combination as claimed in claim 1 wherein said intermediate barrel containing said ultraviolet lamp is formed with a water flow channel allowing passage therethrough of the water to be treated and a compartment isolated from the water flow channel by means of partitions and having an open top, said ultraviolet lamp mounted in the water flow channel and depending from the compartment for treating the water passing through the water flow channel, said compartment containing an air pump for charging fresh air into and foaming the water which passes through the water flow channel.

* * * * *